United States Patent
Hayashi et al.

(10) Patent No.: US 10,063,781 B2
(45) Date of Patent: Aug. 28, 2018

(54) IMAGING CONTROL DEVICE, IMAGING CONTROL METHOD, IMAGING SYSTEM, AND PROGRAM

(71) Applicant: FUJIFILM Corporation, Tokyo (JP)

(72) Inventors: Daisuke Hayashi, Saitama (JP); Mikio Watanabe, Saitama (JP); Takeshi Misawa, Saitama (JP); Masaya Tamaru, Saitama (JP); Hiroyuki Oshima, Saitama (JP); Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/450,717

(22) Filed: Mar. 6, 2017

(65) Prior Publication Data

US 2017/0180650 A1 Jun. 22, 2017

Related U.S. Application Data

(63) Continuation of application No. PCT/JP2015/068131, filed on Jun. 24, 2015.

(30) Foreign Application Priority Data

Sep. 11, 2014 (JP) .................. 2014-184951

(51) Int. Cl.
*H04N 5/232* (2006.01)
*H04N 7/18* (2006.01)
(Continued)

(52) U.S. Cl.
CPC ........... *H04N 5/23293* (2013.01); *G06F 3/14* (2013.01); *H04B 17/318* (2015.01); *H04N 5/23206* (2013.01); *H04N 7/181* (2013.01)

(58) Field of Classification Search
None
See application file for complete search history.

(56) References Cited

U.S. PATENT DOCUMENTS 8,326,113 B2 * 12/2012 Shinkai .............. H04N 5/23206
386/200
2007/0273762 A1 * 11/2007 Steensma ......... G08B 13/19663
348/143
(Continued)

FOREIGN PATENT DOCUMENTS

JP 2002-218544 A 8/2002
JP 2004-260769 A 9/2004
(Continued)

OTHER PUBLICATIONS

International Search Report issued in PCT/JP2015/068131, dated Sep. 29, 2015.
(Continued)

*Primary Examiner* — James Hannett
(74) *Attorney, Agent, or Firm* — Birch, Stewart, Kolasch & Birch, LLP

(57) ABSTRACT

A live view control device according to an aspect of the present invention includes a radio wave intensity detection unit that detects radio wave intensity with respect to each of a plurality of imaging devices, a priority setting unit that sets a priority of a plurality of live view images on the basis of the detected radio wave intensity, a transfer condition setting unit that sets transfer conditions including at least one of a frame rate of transfer and an image size of the transfer of each of the plurality of live view images on the basis of the priorities of the plurality of live view images, and a communication control unit that transmits the set transfer conditions to the plurality of imaging devices via a wireless communication unit.

14 Claims, 14 Drawing Sheets

(51) Int. Cl.
*G06F 3/14* (2006.01)
*H04B 17/318* (2015.01)

(56) References Cited

U.S. PATENT DOCUMENTS

2011/0158313 A1 6/2011 Ogata
2016/0335870 A1* 11/2016 Yum ................... G06F 19/3418

FOREIGN PATENT DOCUMENTS

| | | |
|---|---|---|
| JP | 2007-214831 A | 8/2007 |
| JP | 2009-10625 A | 1/2009 |
| JP | 2011-139200 A | 7/2011 |
| JP | 2013-93842 A | 5/2013 |
| JP | 2014-38336 A | 2/2014 |

OTHER PUBLICATIONS

Written Opinion of the International Searching Authority issued in PCT/JP2015/068131, dated Sep. 29, 2015.

* cited by examiner

FIG. 4

| IMAGING DEVICE | LIVE VIEW IMAGE | RADIO WAVE INTENSITY | PRIORITY | | DISPLAY ASPECT | | TRANSFER CONDITIONS | |
|---|---|---|---|---|---|---|---|---|
| | | | INITIAL | AFTER CHANGE | INITIAL | AFTER CHANGE | INITIAL | AFTER CHANGE |
| 10A | LV1 | WEAK | 1 | 2 | 3-D(1) DISPLAY POSITION 1 | 3-D(1) DISPLAY POSITION 3 | 60 | 20 |
| 10B | LV2 | WEAK | 2 | 2 | 3-D(1) DISPLAY POSITION 2 | 3-D(1) DISPLAY POSITION 2 | 60 | 20 |
| 10C | LV3 | STRONG | 2 | 1 | 3-D(1) DISPLAY POSITION 3 | 3-D(1) DISPLAY POSITION 1 | 60 | 60 |

FIG. 10

| LAYOUT | PRIORITY OF LIVE VIEW IMAGE (IN CASE WHERE COMBINATION IS "1, 2, 3") | | | PRIORITY OF LIVE VIEW IMAGE (IN CASE WHERE COMBINATION IS "1, 2, 2") | | |
|---|---|---|---|---|---|---|
| | LV1 | LV2 | LV3 | LV1 | LV2 | LV3 |
| (OMIT) | | | | | | |
| 3-D(1) | 1 | 2 | 3 | 1 | 2 | 2 |
| 3-D(2) | 1 | 3 | 2 | - | - | - |
| 3-D(3) | 2 | 1 | 3 | 2 | 1 | 2 |
| 3-D(4) | 3 | 1 | 2 | - | - | - |
| 3-D(5) | 2 | 3 | 1 | 2 | 2 | 1 |
| 3-D(6) | 3 | 2 | 1 | - | - | - |
| (OMIT) | | | | | | |

FIG. 12
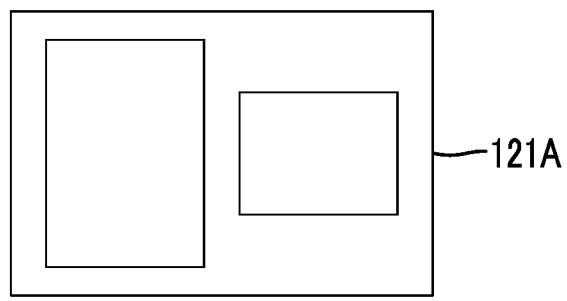
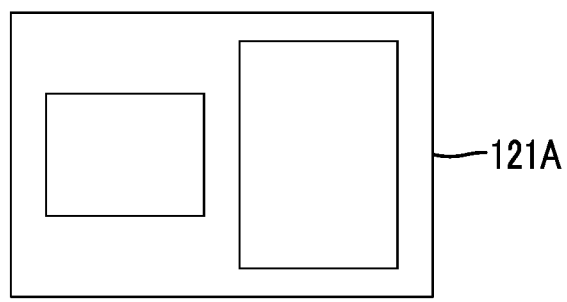

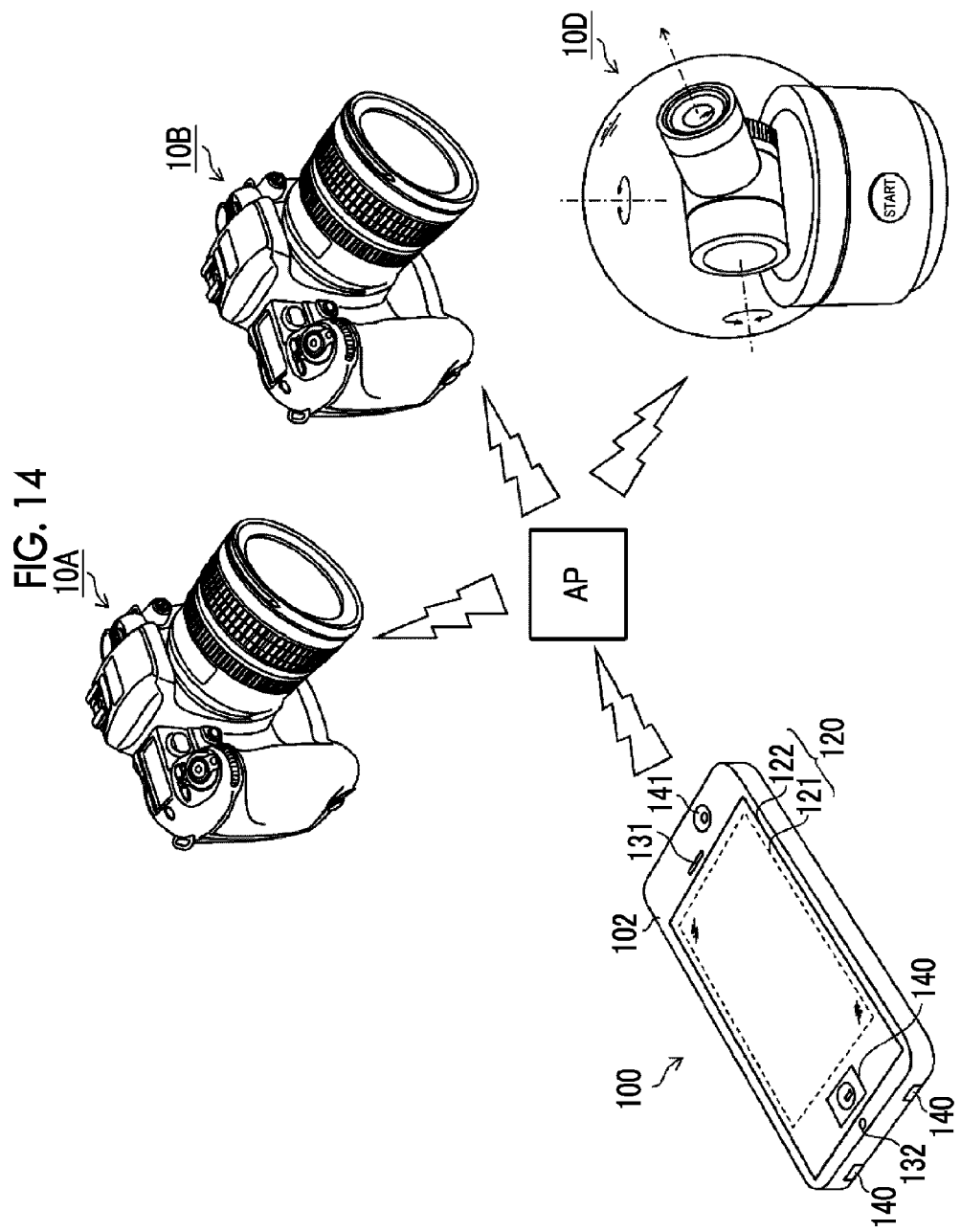

ive view image can be continued to be viewed without significantly degrading display quality by setting transfer conditions with an appropriate balance according to the radio wave intensity of each imaging device, transmitting the transfer conditions to each imaging device, and causing the imaging device to transmit live view images on the basis of the transfer conditions. That is, according to the present aspect, continuous multi-live view processing is possible while maintaining display quality of a plurality of live view images to be presented to a user as much as possible. It is to be noted that the "wireless communication" in the present aspect is not limited to specific communication standards. Further, the "wireless communication unit" in the present aspect is not limited to a specific device configuration and may include, for example, a Wi-Fi communication device, a Bluetooth (registered trademark) communication device, an infrared communication device, and the like.

IMAGING CONTROL DEVICE, IMAGING CONTROL METHOD, IMAGING SYSTEM, AND PROGRAM

CROSS-REFERENCE TO RELATED APPLICATIONS

This application is a Continuation of PCT International Application No. PCT/JP2015/068131 filed on Jun. 24, 2015, which claims priority under 35 U.S.C. § 119(a) to Japanese Patent Application No. 2014-184951 filed on Sep. 11, 2014. Each of the above applications is hereby expressly incorporated by reference, in their entirety, into the present application.

BACKGROUND OF THE INVENTION

1. Field of the Invention

The present invention relates to an imaging control device, an imaging control method, an imaging system, and a program, and more particularly, to an imaging control device, an imaging control method, an imaging system, and a program that receive a plurality of live view images from a plurality of imaging devices through wireless communication.

2. Description of the Related Art

A portable phone capable of wireless communication that causes a user to perform an operation for stopping an active process by reporting to a user that a radio wave environment is poor when the radio wave environment is poor is known (see JP2002-218544A).

A robot capable of wireless communication and movement that moves to a place where a radio wave environment is good when the radio wave environment is poor is known (see JP2004-260769A).

Further, a device that receives a plurality of images from a plurality of computer devices through wireless communication to create, project, and display a multi-screen image, in which switching of connection to the computer devices is performed according to priorities of the plurality of computer devices, is known (see JP2014-038336A).

SUMMARY OF THE INVENTION

A user terminal such as a smartphone or a tablet terminal is required to receive a plurality of live view images transmitted from a plurality of imaging devices through wireless communication and display the plurality of live view images on a display screen (hereinafter referred to as "multi-live view").

If deterioration of a radio wave environment is severe so that wireless communication with all of the plurality of imaging devices cannot be continued during execution of processing of such a multi-live view, stopping the processing of the multi-live view is considered. However, processing of the multi-live view is required to be continued if deterioration of the radio wave environment is less so that wireless communication can be continued even when the radio wave environment deteriorates.

However, there is a problem in that frames dropping occurs due to deterioration of the radio wave environment during multi-live view processing, and appearance of the live view image deteriorates.

Further, since a degree of deterioration of the radio wave environment with respect to a plurality of imaging devices is different even when the radio wave environment deteriorates, it can be considered that a live view image greatly affected by the deterioration of the radio wave environment may be viewed with the deterioration of display quality suppressed as much as possible from the point of view of a user, and a live view image not affected by the deterioration of the radio wave environment or less affected by the deterioration of the radio wave environment may be viewed with the display quality maintained as much as possible.

In JP2002-218544A and JP2004-260769A, disclosure of the viewpoint of continuing a process without significantly degrading image display quality even when a radio wave environment deteriorates lacks.

JP2014-038336A merely discloses setting priorities of the plurality of computer devices that are wireless communication partners, and discloses or suggests no continuing of a process without significantly degrading image display quality even when a radio wave environment deteriorates lacks during execution of multi-live view processing.

Therefore, even when the technologies described in JP2002-218544A, JP2004-260769A, and JP2014-038336A are applied to a multi-live view, multi-live view processing cannot be continued without significantly degrading display quality of the live view image when the radio wave environment deteriorates. Even when the technology described in JP2002-218544A is applied, it can be said that it is a limit to send a notification to a user so that the user performs an operation to stop multi-live view processing when a radio environment becomes poor. Even when the technology described in JP2004-260769A is applied, it can be said that it is a limit to cause a user to move from a current position so that a radio wave environment becomes good when a radio wave environment is poor. Even when the technology described in JP2014-038336A is applied, it can be said that it is a limit to switch a connection to the imaging device according to the priority set for the imaging device.

SUMMARY OF THE INVENTION

The present invention has been made in view of the above-described circumstances, and an object of the present invention is to provide an imaging control device, an imaging control method, an imaging system, and a program capable of continuing multi-live view processing without significantly degrading display quality of a live view image to be presented to a user even when a radio wave environment deteriorates in a case where a plurality of live view images captured by a plurality of imaging devices are received through wireless communication and displayed.

An aspect of the present invention is an imaging control device, comprising: a wireless communication unit that receives a plurality of live view images from a plurality of imaging devices through wireless communication; a display control unit that displays each of the plurality of live view images received from the plurality of imaging devices in each of a plurality of areas of a display screen capable of displaying an image; a radio wave intensity detection unit that detects radio wave intensity with respect to each of the plurality of imaging devices, a priority setting unit that sets a priority of the plurality of live view images on the basis of the radio wave intensity detected by the radio wave intensity detection unit; a transfer condition setting unit that sets transfer conditions including at least one of a frame rate of transfer and an image size of the transfer of each of the plurality of live view images on the basis of the priorities of the plurality of live view images; and a communication control unit that transmits the transfer conditions set by the transfer condition setting unit to the plurality of imaging devices via the wireless communication unit.

According to an aspect of the present invention, since the priority of the plurality of live view images is set on the basis of the radio wave intensity with respect to each of the plurality of imaging devices, and transfer conditions of each of the plurality of live view images are set on the basis of the priority of the plurality of live view images and transmitted to the plurality of imaging devices, it is possible to provide the user with a live view image greatly affected by deterioration of the radio wave environment while suppressing deterioration of display quality as much as possible and to provide the user with the live view image not affected by the deterioration of the radio wave environment or less affected by the deterioration of the radio wave environment while maintaining the display quality as much as possible. That is, it is possible to continue multi-live view processing without significantly degrading display quality of a live view image to be presented to a user even when a radio wave environment deteriorates.

According to an aspect of the present invention, the imaging control device further comprises: a radio wave intensity comparison unit that compares radio wave intensity with respect to each of the plurality of imaging devices with a threshold value, in which the priority setting unit sets a lower priority in a case where the radio wave intensity is smaller than the threshold value than in a case where the radio wave intensity is equal to or greater than the threshold value, and the transfer condition setting unit decreases at least one of a frame rate of the transfer and an image size of the transfer when the priority is lower.

According to this aspect, since at least one of the frame rate of the transfer of the live view image corresponding to the weak radio wave intensity and the image size of the transfer can be decreased and the frame rate of the transfer of the live view image corresponding to strong radio wave intensity and the image size of the transfer can be maintained, the live view image corresponding to the weak radio wave intensity can be presented to the user while suppressing frame dropping, and the live view image corresponding to the strong radio wave intensity can be presented to the user with maintained display quality.

According to an aspect of the present invention, the imaging control device further comprises a display aspect setting unit that changes an aspect of a display of the live view image according to the priority.

According to this aspect, it is possible to maintain an appearance of a live view image corresponding to the radio wave intensity not affected by the deterioration of the radio wave environment or less affected by the deterioration of the radio wave environment while suppressing degradation of an appearance of the live view image greatly affected by deterioration of the radio wave environment by changing the display aspect of the live view image according to the priority of the live view image set on the basis of the radio wave intensity.

In an aspect of the present invention, the display aspect setting unit sets, among a plurality of live view images, at least one of a display size and a display position of the live view image according to the priority.

According to this aspect, it is possible to maintain an appearance of a live view image corresponding to the strong radio wave intensity by not changing the display size and the display position while suppressing degradation of an appearance of the weak live view image by changing at least one of the display size and the display position.

In an aspect of the present invention, the display control unit displays the detected wave intensity on the display screen.

In an aspect of the present invention, the display control unit displays the at least one of the frame rate of transfer and the image size of transfer of each of the plurality of live view images on the display screen.

In an aspect of the present invention, the communication control unit transmits an imaging instruction to the plurality of imaging devices via the wireless communication unit after the live view image is received, and receives a plurality of images captured by the plurality of imaging devices according to the imaging instruction from the plurality of imaging devices via the wireless communication unit.

In an aspect of the present invention, the communication control unit receives the images captured automatically in the plurality of imaging devices from the plurality of imaging devices.

An aspect of the present invention relates to an imaging system comprising an imaging device and an imaging control device.

An aspect of the present invention is an imaging control method, comprising: a step of receiving a plurality of live view images from a plurality of imaging devices through wireless communication; a step of displaying each of the plurality of live view images received from the plurality of imaging devices in each of a plurality of areas of a display screen capable of displaying an image; a step of detecting radio wave intensity with respect to each of the plurality of imaging devices; a priority setting step of setting a priority of the plurality of live view images on the basis of the detected radio wave intensity; a transfer condition setting step of setting transfer conditions including at least one of a frame rate of transfer and an image size of the transfer of each of the plurality of live view images on the basis of the priorities of the plurality of live view images; and a step of transmitting the set transfer conditions to the plurality of imaging devices through wireless communication.

In an aspect of the present invention, the imaging control method further comprises: a step of comparing radio wave intensity with a threshold value, in which a lower priority is set in a case where the radio wave intensity is smaller than the threshold value than in a case where the radio wave intensity is equal to or greater than the threshold value, and at least one of a frame rate of the transfer and an image size of the transfer is decreased when the priority is lower.

In an aspect of the present invention, the aspect of a display of the live view image is changed according to the priority.

In an aspect of the present invention, at least one of the display size and the display position of the live view image is set among a plurality of live view images according to the priority.

An aspect of the present invention is a program that causes a computer to execute steps of: receiving a plurality of live view images from a plurality of imaging devices through wireless communication; displaying each of the plurality of live view images received from the plurality of imaging devices in each of a plurality of areas of a display screen capable of displaying an image; detecting radio wave intensity with respect to each of the plurality of imaging devices; setting a priority of the plurality of live view images on the basis of the detected radio wave intensity; setting transfer conditions including at least one of a frame rate of transfer and an image size of the transfer of each of the plurality of live view images on the basis of the priorities of the plurality of live view images; and transmitting the set transfer conditions to the plurality of imaging devices through wireless communication. A computer-readable non-transitory recording medium having this program recorded thereon is included in an aspect of the present invention.

According to the present invention, it is possible to continue multi-live view processing without significantly degrading display quality of a live view image to be presented to a user even when a radio wave environment deteriorates in a case where a plurality of live view images captured by a plurality of imaging devices are received through wireless communication and displayed.

BRIEF DESCRIPTION OF THE DRAWINGS

FIG. 4 is an illustrative diagram illustrating an example of multi-live view control information.

FIG. 10 is an illustrative diagram that is used for description of display aspect change control information indicating a correspondence relationship between a priority of a live view image and a layout that is an example of a display aspect.

FIG. 12 is an illustrative diagram that is used for description of a layout pattern change due to a change in priority according to a change in radio wave intensity.

FIG. 14 is a system configuration diagram illustrating another example of the live view system.

DESCRIPTION OF THE PREFERRED EMBODIMENTS

Hereinafter, embodiments of the present invention will be described with reference to the drawings.

[Configuration of Live View System]

Figure 1:
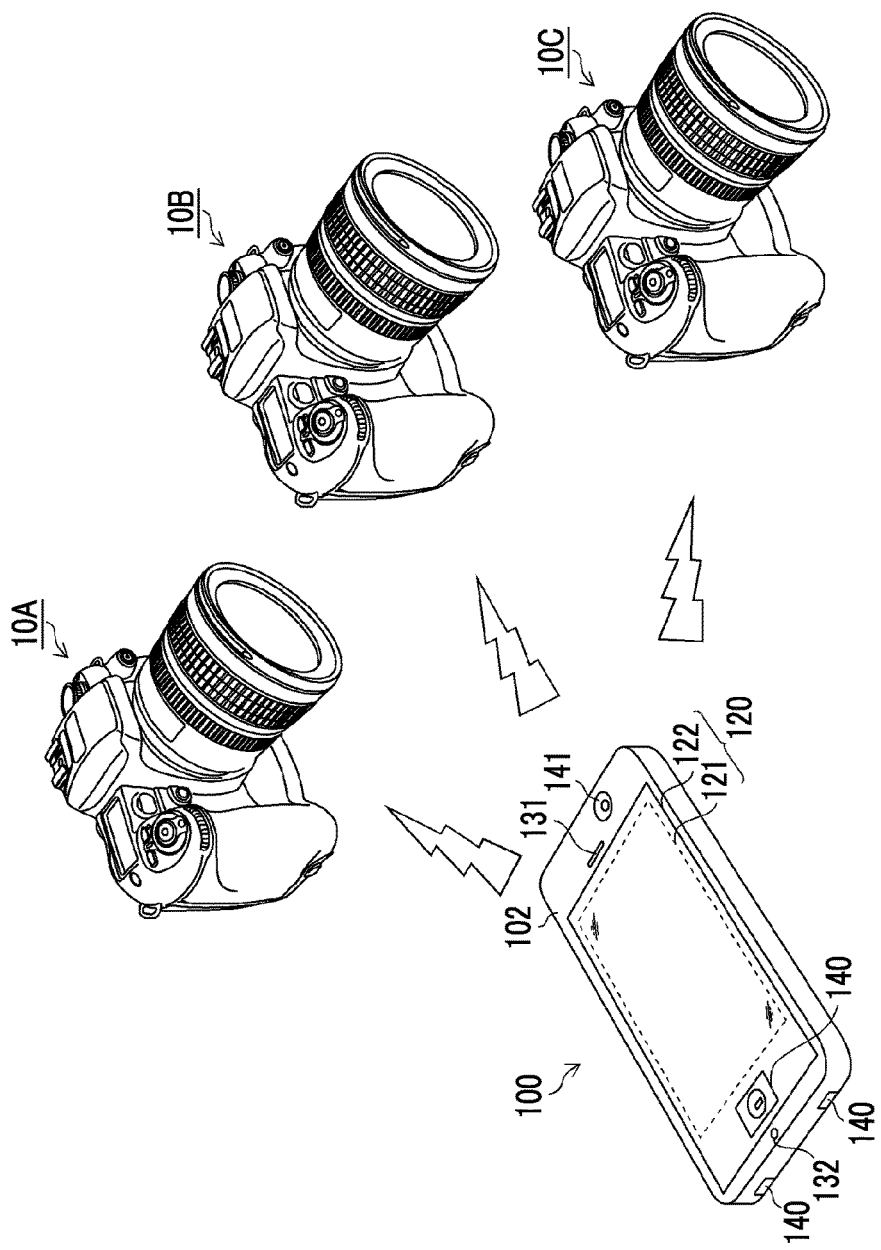
FIG. 1 is a system configuration diagram illustrating an example of a live view system.

FIG. 1 is a configuration diagram illustrating an example of a live view system including a plurality of imaging devices 10A, 10B, and 10C and a smartphone 100. Hereinafter, at least one of the plurality of imaging devices 10A, 10B, and 10C may be referred to as an "imaging device 10" in some cases.

In this example, each of the plurality of imaging devices 10A, 10B, and 10C and the smartphone 100 directly perform wireless communication.

[Example of Hardware Configuration of Smartphone]

Figure 2:
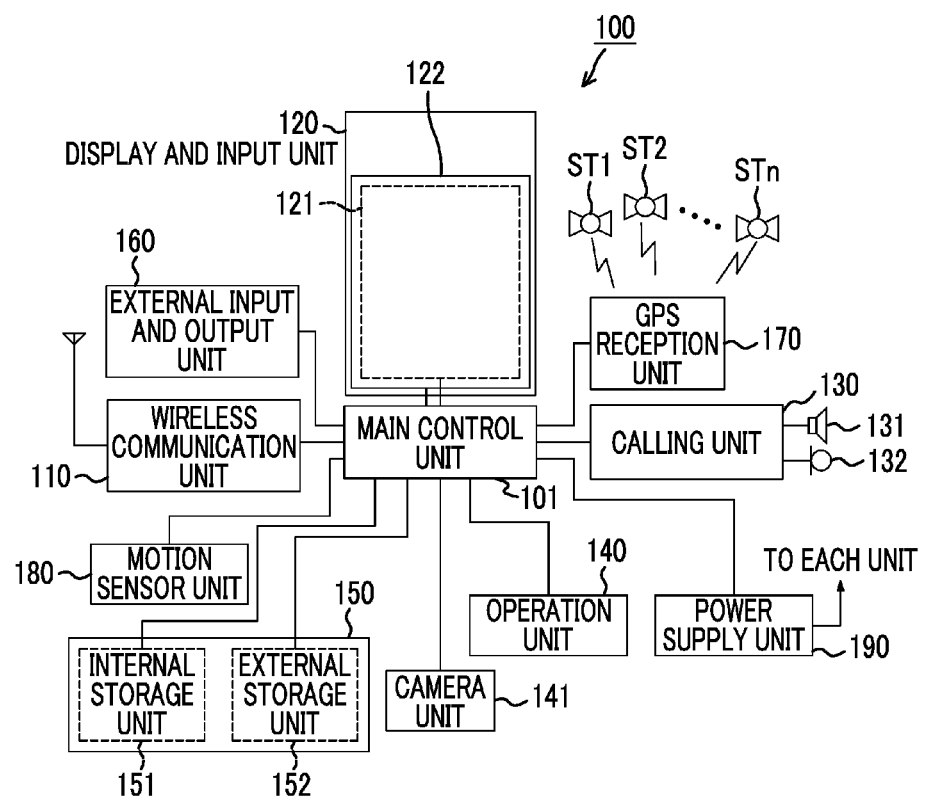
FIG. 2 is a block diagram illustrating a hardware configuration of an example of a smartphone.

FIG. 2 is a block diagram illustrating a hardware configuration of the smartphone 100 illustrated in FIG. 1.

As illustrated in FIG. 2, main components of the smartphone 100 include a wireless communication unit 110, a display and input unit 120, a calling unit 130, an operation unit 140, a camera unit 141, a storage unit 150, an external input and output unit 160, a global positioning system (GPS) reception unit 170, a motion sensor unit 180, a power supply unit 190, and a main control unit 101. Further, a main function of the smartphone 100 includes a wireless communication function of performing mobile wireless communication via a base station device and a mobile communication network.

The wireless communication unit 110 performs wireless communication with the base station device accommodated in the mobile communication network according to an instruction of the main control unit 101. Using this wireless communication, transmission and reception of various types of file data such as audio data and image data, e-mail data, or the like, or reception of web data, streaming data, or the like is performed. In this example, the wireless communication unit 110 of the smartphone 100 transmits an instruction input for various operations to the imaging device 10, or receives a live view image, an image for recording, or the like from the imaging device 10.

The display and input unit 120 is a so-called touch panel that displays an image (a still image and a video), text information, or the like to visually deliver information to a user under the main control unit 101, and detects a user operation for the displayed information. The display and input unit 120 includes a display panel 121 and an operation panel 122. In a case in which a 3D image is viewed, it is preferable for the display panel 121 to be a 3D display panel.

The display panel 121 uses a liquid crystal display (LCD), an organic electro-Luminescence display (OELD), or the like as a display device.

The operation panel 122 is a device that is placed so that an image displayed on a display screen of the display panel 121 can be viewed, and detects one or a plurality of coordinates operated by a finger of a user or a stylus. If this device is operated by the finger of the user or the stylus, the operation panel 122 outputs a detection signal generated due to the operation to the main control unit 101. Then, the main control unit 101 detects an operation position (coordinates) on the display panel 121 on the basis of the received detection signal.

As illustrated in FIG. 1, the display panel 121 and the operation panel 122 of the smartphone 100 are integrally formed to constitute a display and input unit 120, but the operation panel 122 is arranged to completely cover the display panel 121. In a case in which this arrangement is adopted, the operation panel 122 may also have a function of detecting a user operation for an area other than the display panel 121. In other words, the operation panel 122 may include a detection area (hereinafter referred to as a display area) for an overlapping portion which overlaps the display panel 121, and a detection area (hereinafter referred to as a non-display area) for an outer edge portion which does not overlap the display panel 121, other than the display area.

A size of the display area and a size of the display panel 121 may completely match, but do not need to necessarily match. Further, the operation panel 122 may include two sensitive areas including the outer edge portion and an inner portion other than the outer edge portion. Further, a width of the outer edge portion may be appropriately designed according to, for example, a size of a housing 102. Further, a position detection scheme adopted in the operation panel 122 may include a matrix switch scheme, a resistive film scheme, a surface acoustic wave scheme, an infrared scheme, an electromagnetic induction scheme, a capacitive scheme, and the like, and any one of the schemes may be adopted.

The calling unit 130 includes a speaker 131 or a microphone 132. The calling unit 130 converts voice of the user input via the microphone 132 into audio data which can be processed by the main control unit 101 and outputs the audio data to the main control unit 101, or decodes the audio data received by the wireless communication unit 110 or the external input and output unit 160 and outputs the audio data from the speaker 131. Further, as illustrated in FIG. 1, for example, the speaker 131 and the microphone 132 may be mounted on the same surface as the surface in which the display and input unit 120 is provided.

The operation unit 140 is a hardware key using a key switch or the like, and receives an instruction from the user. For example, the operation unit 140 is mounted on a lower surface in a lower portion in a display portion of the housing 102 of the smartphone 100, and is a push button switch that is turned ON when pressed by a finger or the like and turned OFF due to a restoring force of a spring or the like when the finger is released.

The storage unit 150 stores a control program or control data of the main control unit 101, address data associated with, for example, a name or a telephone number of a communication partner, transmitted and received e-mail data, web data downloaded by web browsing, or downloaded content data, and temporarily stores streaming data or the like. Further, the storage unit 150 includes an internal storage unit 151 built in the smartphone and an external storage unit 152 having a slot for an external memory that is detachable. Each of the internal storage unit 151 and the external storage unit 152 constituting the storage unit 150 is realized using a storage medium, such as a flash memory type, hard disk type, multimedia card micro type, or card type of memory (for example, a Micro SD (registered trademark) memory), a random access memory (RAM), or a read only memory (ROM).

The external input and output unit 160 serves as an interface with all of external devices connected to the smartphone 100, and is directly or indirectly connected with other external devices through, for example, communication (for example, Universal Serial Bus (USB) or IEEE1394) or a network (for example, the Internet, wireless LAN, Bluetooth (registered trademark), radio frequency identification (RFID), infrared communication (infrared Data Association: IrDA; registered trademark), UWB (Ultra Wideband; registered trademark), or ZigBee (registered trademark)).

Examples of the external device connected to the smartphone 100 include a wired/wireless headset, a wired/wireless external charger, a wired/wireless data port, a memory card or a subscriber identity module card (SIM)/user identity module card (UIM) card connected via a card socket, an external audio and video device connected via an audio and video input/output (I/O) terminal, a wirelessly connected external audio and video device, a wiredly/wirelessly connected smartphone, a wiredly/wirelessly connected personal computer, a wiredly/wireless connected PDA, and an earphone. The external input-output unit can transfer data received from such an external device to each component inside the smartphone 100, or send internal data of the smartphone 100 to the external device.

The GPS reception unit 170 receives GPS signals that are transmitted from GPS satellites ST1 to STn, executes a positioning calculation process based on a plurality of received GPS signals, and detects a position including a latitude, a longitude, and an altitude of the smartphone 100 according to an instruction of the main control unit 101. When the GPS reception unit 170 can acquire position information from the wireless communication unit 110 or the external input and output unit 160 (for example, wireless LAN), the GPS reception unit 170 can also detect the position using the position information.

The motion sensor unit 180 includes, for example, a three-axis acceleration sensor, and detects a physical motion of the smartphone 100 according to an instruction of the main control unit 101. By detecting the physical movement of the smartphone 100, a movement direction or an acceleration of the smartphone 100 is detected. A result of the detection is output to the main control unit 101.

The power supply unit 190 supplies power accumulated in a battery (not illustrated) to each unit of the smartphone 100 according to an instruction of the main control unit 101.

The main control unit 101 includes a microprocessor. The main control unit 101 operates according to the control program or the control data stored in the storage unit 150 and generally controls each unit of the smartphone 100. Further, the main control unit 101 has a mobile communication control function of controlling each unit of a communication system, and an application processing function in order to perform audio communication or data communication through the wireless communication unit 110.

The application processing function is realized by the main control unit 101 operating according to application software stored in the storage unit 150. Examples of the application processing function includes an infrared communication function of controlling the external input and output unit 160 and performing data communication with a facing device, an e-mail function of performing transmission and reception of an e-mail, and a web browsing function of viewing web pages.

Further, the main control unit 101 has an image processing function of, for example, displaying an image on the display and input unit 120 based on image data (data of a still image or a video) such as received data or downloaded streaming data. The image processing function refers to a function of the main control unit 101 decoding the image data, performing image processing on a result of the decoding, and displaying the image on the display and input unit 120.

Further, the main control unit 101 executes display control for the display panel 121, and an operation detection control for detecting a user operation through the operation unit 140 or the operation panel 122.

Through the execution of the display control, the main control unit 101 displays an icon for starting up the application software or a software key such as a scroll bar, or displays a window for creating an e-mail. The scroll bar refers to a software key for receiving an instruction for moving an image display portion for a large image that cannot be fitted in the display area of the display panel 121.

Further, through the execution of the operation detection control, the main control unit 101 detects a user operation through the operation unit 140, or receives an operation for the icon or an input of a character string to an input field of the window or receives a request for scroll of a display image using the scroll bar via the operation panel 122.

Further, the main control unit 101 has a touch panel control function of determining whether an operation position for the operation panel 122 is the overlapping portion that overlaps the display panel 121 (display area) or the other outer edge portion (non-display area) that does not overlap the display panel 121, and controlling the sensitive area of the operation panel 122 or a display position of the software key, through the execution of the operation detection control.

Further, the main control unit 101 can also detect a gesture operation for the operation panel 122, and execute a preset function according to the detected gesture operation. The gesture operation refers to an operation of drawing a trajectory with a finger or the like, designating a plurality of positions simultaneously, or combining these and drawing a trajectory for at least one of a plurality of positions, rather than a conventional simple touch operation.

The camera unit 141 is a digital camera that performs electronic imaging using an imaging element such as a complementary metal oxide semiconductor (CMOS) or a charge-coupled device (CCD). Further, the camera unit 141 can convert the image data obtained through imaging into, for example, compressed image data such as joint photographic coding experts group (JPEG), and record the compressed image data in the storage unit 150 or output the compressed image data via the external input and output unit 160 or the wireless communication unit 110 under the control of the main control unit 101. In the smartphone 100 illustrated in FIG. 1, the camera unit 141 is mounted on the same surface as the display and input unit 120, but a mounting position of the camera unit 141 is not limited thereto and may be mounted on a back surface of the display and input unit 120. Alternatively, a plurality of camera units 141 may be mounted. In a case in which the plurality of camera units 141 are mounted, switching to the camera unit 141 provided for imaging may be performed and imaging may be performed using only such a camera unit 141, or imaging may be performed using the plurality of camera units 141 at the same time.

Further, the camera unit 141 can be used for various functions of the smartphone 100. For example, the image acquired by the camera unit 141 can be displayed on the display panel 121, or the image of the camera unit 141 can be used as one operation input of the operation panel 122. Further, when the GPS reception unit 170 detects the position, the GPS reception unit 170 can also detect the position by referring to the image from the camera unit 141. Further, the optical axis direction of the camera unit 141 of the smartphone 100 can be determined or a current use environment can be determined by referring to the image from the camera unit 141 without using the 3-axis acceleration sensor, or in combination with the 3-axis acceleration sensor. Of course, the image from the camera unit 141 can also be used within the application software.

In this example, by downloading application software for operating the imaging device 10 over a network or the like, storing the application software in the storage unit 150, and operating the main control unit 101 according to the downloaded application software using the application processing function of the smartphone 100, the general-purpose smartphone 100 functions as a user interface (UI unit) for operating the imaging device 10.

Figure 3:
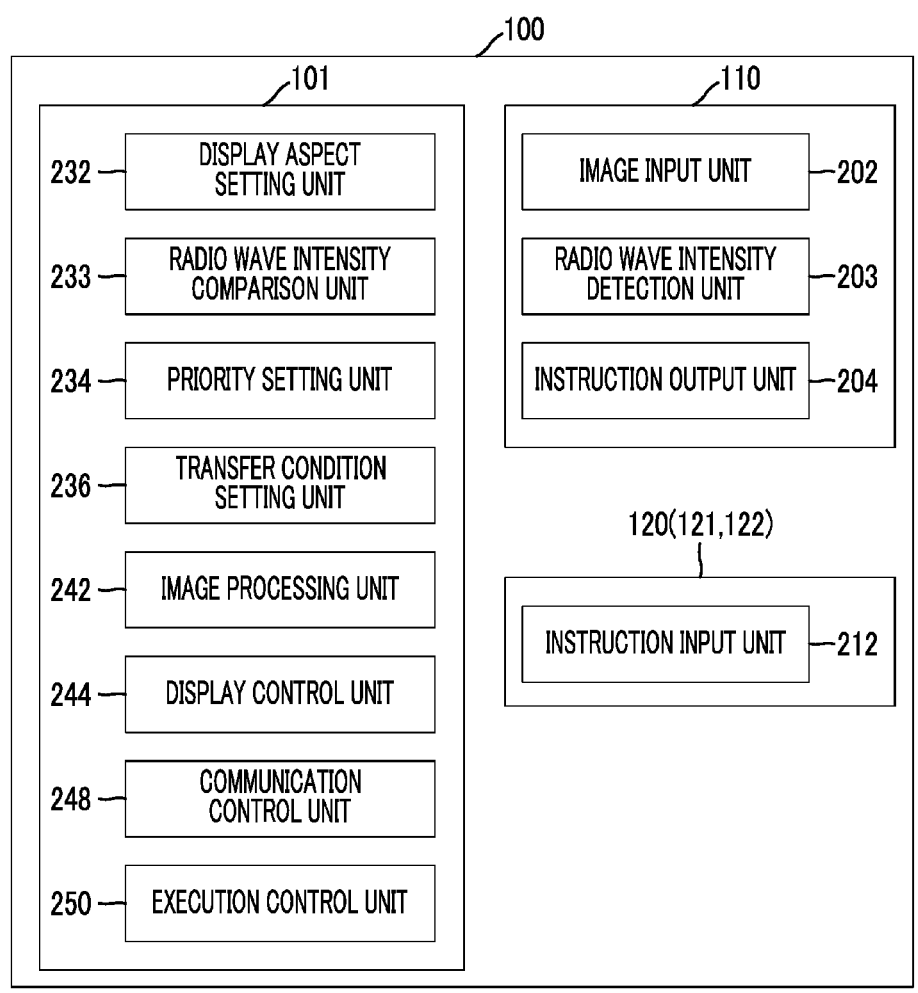
FIG. 3 is a block diagram illustrating an internal configuration example of main units of the present invention.

FIG. 3 is a block diagram illustrating a configuration example of main components of a live view control device of the present invention. In FIG. 3, the smartphone 100 is an example of a live view control device of the present invention.

The wireless communication unit 110 of the smartphone 100 is used as an image input unit 202 that receives (inputs) the plurality of live view images from the plurality of the imaging devices 10, a radio wave intensity detection unit 203 that detects radio wave intensity with respect to each of the plurality of imaging devices 10, and an instruction output unit 204 that transmits (outputs) an instruction of transfer conditions to the plurality of imaging devices 10.

The display and input unit 120 of the smartphone 100 is used as an instruction input unit 212 that receives an instruction input of the user.

The main control unit 101 of the smartphone 100 includes a display aspect setting unit 232 that sets a display aspect of a plurality of live view images, a comparison unit 233 that compares radio wave intensity with respect to each of the plurality of imaging devices 10 with a threshold value, a priority setting unit 234 that sets a priority of a plurality of live view images among a plurality of live view images, a transfer condition setting unit 236 that sets transfer conditions including at least one of a frame rate of transfer of the plurality of live view images and an image size of the transfer on the basis of the priority among the live view images, an image processing unit 242 that performs image processing on the live view image received from the plurality of imaging devices 10, a display control unit 244 that displays each of the plurality of live view images received from the plurality of the imaging devices 10 in each of a plurality of areas of the display panel 121 (which is an example of a display screen capable of displaying an image), a communication control unit 248 that transmits the transfer conditions set by the transfer condition setting unit 236 to the plurality of imaging devices 10 via the wireless communication unit 110, and an execution control unit 250 that controls execution of processing in each unit of the smartphone 100 according to a program stored in the storage unit 150.

Next, an aspect of setting of a priority in the priority setting unit 234 of the smartphone 100 will be described.

The priority setting unit 234 of the smartphone 100 first sets the priority of the live view images on the basis of, for example, the display aspect of the plurality of live view images set by the user. The display aspect indicates an aspect in which the display control unit 244 displays the live view image on the display panel 121 in this disclosure. The priority may be set according to a situation of a display (hereinafter referred to as a "display situation") of the live view image actually displayed on the display panel 121 under control of the display control unit 244.

The aspect of a display of the live view image may include the following examples.

A display size of the live view image.
A display position of the live view image.
Whether or not to enlarge and display the live view image. Alternatively, an enlargement rate.
Whether or not to blur and display the live view image. Alternatively, a blur rate.

The display situation of the live view image may include the following examples.

Presence or absence of a specific subject image in the live view image.
Importance of a subject image in the live view image (for example, a predetermined order of subject images).
At least one of presence or absence, a size, and a moving speed of a moving subject image in the live view image.
A background in the live view image.
Continuous display time of the live view image.

The display aspect of the live view image may be set and input by the user using the display aspect setting unit 232 or may be automatically set.

The display situation of the live view image may be detected from the live view image by the main control unit 101 or may be detected from information that the imaging device 10 has added to the live view image. The user may determine the display situation from the displayed live view image and input information corresponding to the display situation to the smartphone 100.

The display aspect and the display situation of the live view image are not particularly limited to the above-described examples.

The priority setting unit 234 of the smartphone 100 secondly sets the priority of the plurality of live view images on the basis of the radio wave intensity with respect to each of the plurality of imaging devices 10A, 10B, and 10C detected by the radio wave intensity detection unit 203. That is, a change (resetting) in priority is performed according to a change in radio wave intensity with respect to the plurality of imaging devices 10A, 10B, and 10C.

FIG. 4 illustrates an example of multi-live view control information that is managed by the main control unit 101 of the smartphone 100. Information of column "Imaging Device" in FIG. 4 is identification information indicating the plurality of imaging devices 10A, 10B, and 10C illustrated in FIG. 1. Information of column "Live View Image" in FIG. 4 is identification information indicating the plurality of live view images LV1, LV2, and LV3 that are received from the plurality of imaging devices 10A, 10B, and 10C illustrated in FIG. 1 through wireless communication. Information of column "radio wave intensity" of FIG. 4 indicates radio wave intensity that is detected by the radio wave intensity detection unit 203. Information of column "Priority" of FIG. 4 indicates a priority among the plurality of live view images. "Priority" of this example is set by the priority setting unit 234. There are a case where the priority is "1", "2", and "2" (that is, a case where there are a combination of different priorities and a combination of the same priorities), and a case where the priority is "1", "2", and "3" (that is, a case where priorities are different in all combinations), as illustrated in FIG. 4. Information of column "Display Aspect" of FIG. 4 indicates a display aspect of each live view image. "Display Aspect" in this example indicates the display size and the display position set by the display aspect setting unit 232. Information of column "Transfer Conditions" of FIG. 4 is transfer conditions (set value) that are transmitted to the plurality of imaging devices 10A, 10B, and 10C and set in the imaging devices. The transfer conditions of this example are set in the transfer condition setting unit 236.

The multi-live view control information illustrated in FIG. 4 is an example, and information for controlling the execution of the multi-live view is not particularly limited to the information illustrated in FIG. 4.

Figure 5:
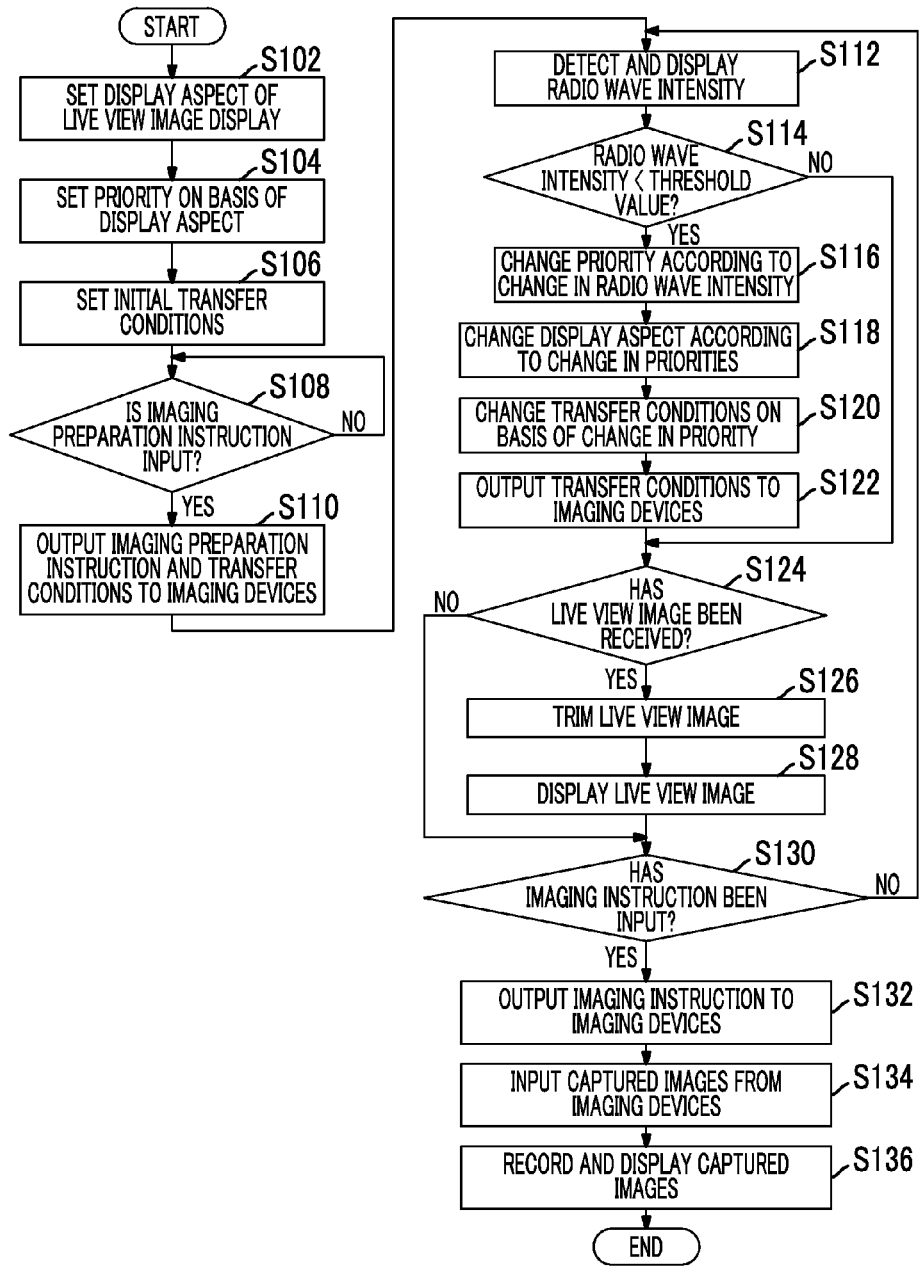
FIG. 5 is a flowchart illustrating an example of a live view control process.

A flow of an example of a live view control method in the smartphone 100 will be described using a flowchart of FIG. 5. The process in the smartphone 100 illustrated in FIG. 5 is executed according to a program stored in the storage unit 150 of the smartphone 100 by the execution control unit 250 of the smartphone 100. The imaging device 10 is assumed to be a state in which a power switch has been already turned on and initialization has ended.

The display aspect setting unit 232 of the smartphone 100 performs setting of a layout of a live view image display (which is an example of a display aspect) (step S102).

Figure 6:
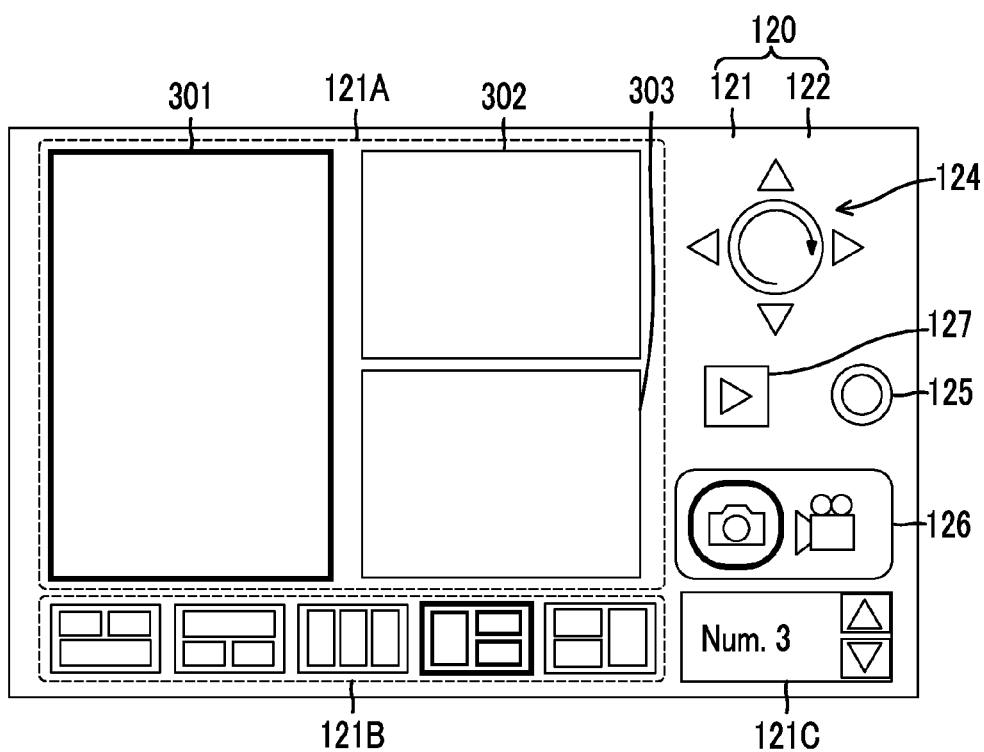
FIG. 6 is an illustrative diagram that is used for description of a multi-live view screen.

For example, as illustrated in FIG. 6, a multi-live view screen including a live view image display area 121A, a layout pattern selection area 121B, and an imaging device number selection area 121C is displayed on the display panel 121 (which is an example of a display screen) of the display and input unit 120. The live view image display area 121A includes a plurality of areas (a first image display area 301, a second image display area 302, and a third image display area 303) for displaying a plurality of live view images LV1 to LV3 that are received from the plurality of imaging devices 10A to 10C. Further, the live view images LV1 to LV3 are not displayed in this step. The layout pattern selection area 121B is an area for displaying patterns (shapes) of a layout selectable corresponding to the number of imaging devices selected and input in the imaging device number selection area 121C and receiving a selection input of the pattern of the layout from the user. Reference numerals 124 to 127 are icon buttons.

Figure 7:
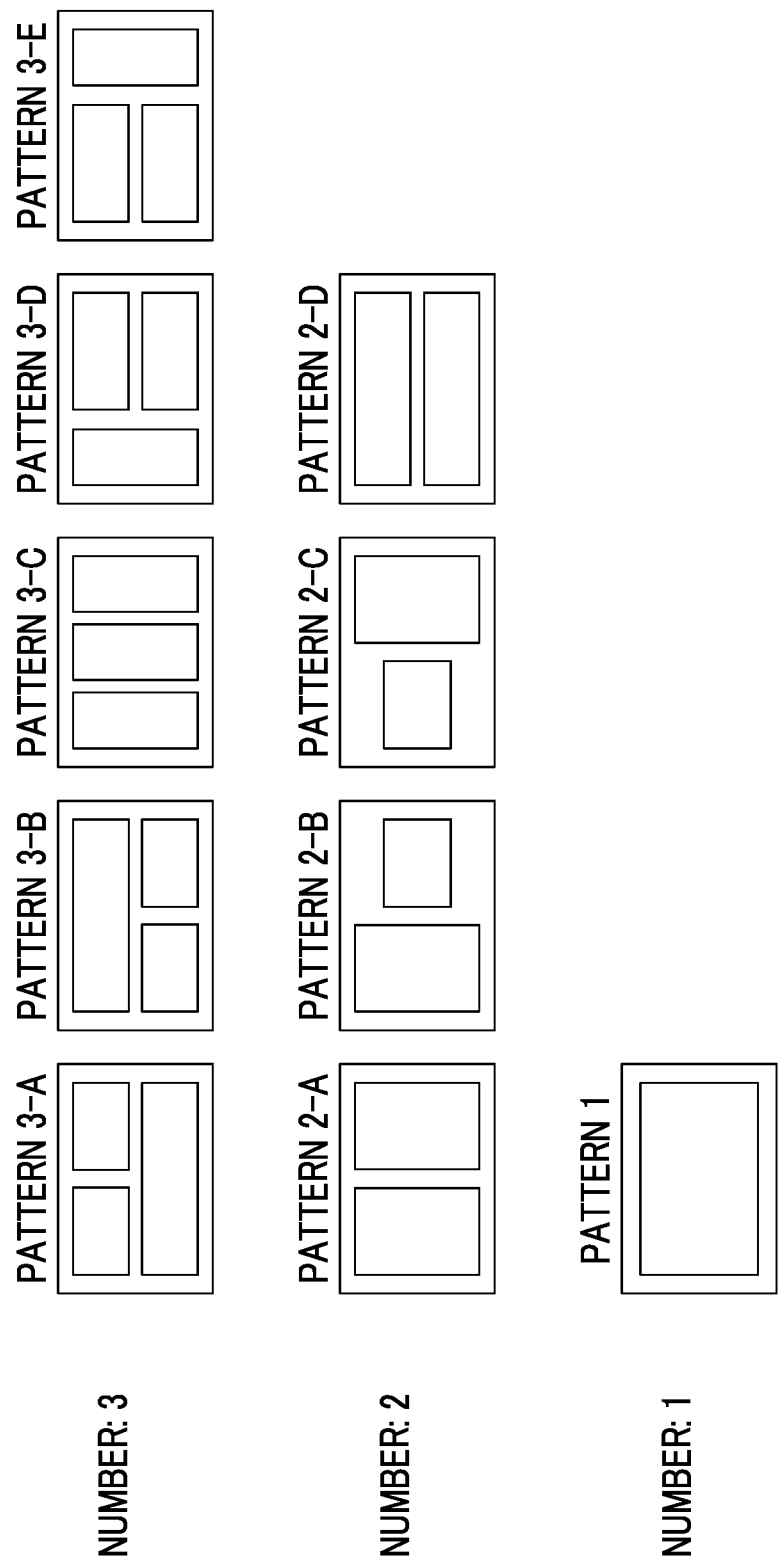
FIG. 7 is a first illustrative diagram that is used for description of setting of a layout that is an example of a display aspect.

In a state in which such a multi-live view screen is displayed on the display and input unit 120, the user can select a desired layout pattern from among a plurality of layout patterns illustrated in FIG. 7 (pattern 1 in a case where the imaging device number is 1, patterns 2-A, 2-B, 2-C, and 2-D in a case where the imaging device number is 2, and patterns 3-A, 3-B, 3-C, 3-D, and 3-E in a case where the imaging device number is 3 by selecting and inputting the number of imaging devices in the imaging device number selection area 121C and selecting and inputting a pattern of a layout determined for each number of imaging units in the layout pattern selection area 121B.

Figure 8:
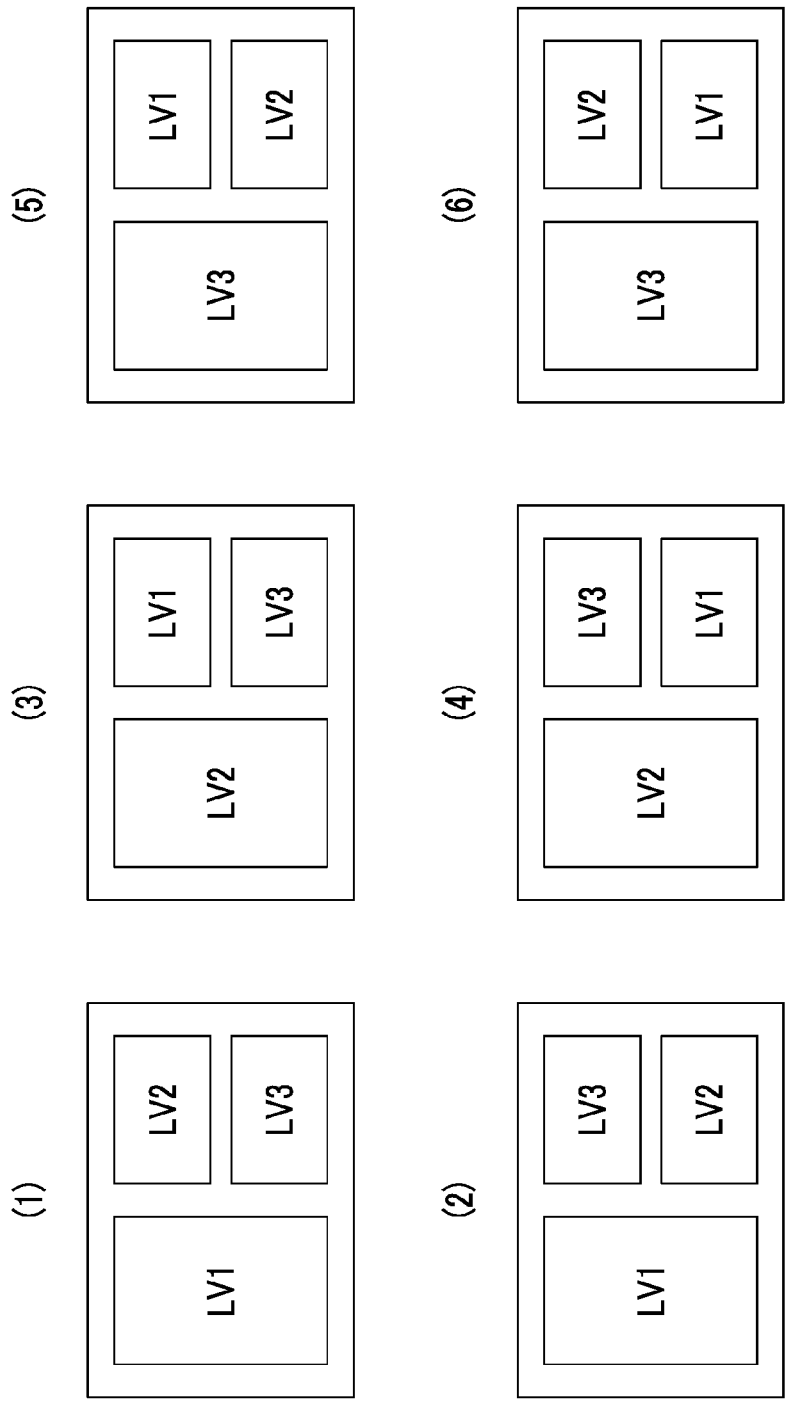
FIG. 8 is a second illustrative diagram that is used for description of setting of a layout that is an example of a display aspect.

In a case where "3" is selected as the number of imaging devices and pattern 3-D is selected, six different layouts may be considered according to a difference between relative frame positions, as illustrated in FIG. 8. For example, in a case where layout (1) in FIG. 8 is a default layout, the user can change a display position and a display size of the live view image through a slide operation. The live view images LV1 to LV3 are not displayed in this step.

Layout information indicating the layout selected by the user is stored in the storage unit 150. Here, the layout information includes information indicating at least the display size and the display position of each live view image.

Then, the priority setting unit 234 of the smartphone 100 sets the priority of the plurality of live views corresponding to the plurality of respective imaging devices 10A to 10C, among the plurality of live view images, on the basis of the layout (which is an example of a display aspect) selected in step S102 (step S104). For example, as shown in column "initial" of "priority" in FIG. 4, priority 1 is set for a live view image LV1 that is input from the imaging device 10A, and priority 2 is set for a live view image LV2 that is input from the imaging device 10B and a live view image LV3 that is input from the imaging device 10C. Here, the priority is set on the basis of the layout (which is an example of a display aspect) of the plurality of live view images LV1, LV2, and LV3 instead of being set on the basis of which of the plurality of imaging devices 10A, 10B, and 10C inputs the live view image.

The transfer condition setting unit 236 of the smartphone 100 sets initial transfer conditions of the plurality of live view images that are transmitted from the plurality of imaging devices 10A to 10C to the smartphone 100 (step S106). In this step, as shown in column "Initial" of "Transfer Conditions" of FIG. 4, the same transfer conditions are set for the plurality of live view images LV1, LV2, and LV3. That is, transfer conditions under which a high transfer rate is allowed is set on the assumption that the radio wave intensity with respect to any of the plurality of imaging devices 10A to 10C is good.

It is determined whether or not an imaging preparation instruction for imaging performed by the plurality of imaging devices 10A to 10C is input to the instruction input unit 212 of the smartphone 100 (step S108). For example, in a case where pressing of the release button icon 125 in FIG. 6 is performed once, the imaging preparation instruction is determined to be input.

In a case where the imaging preparation instruction is input to the instruction input unit 212 of the smartphone 100 (YES in step S108), the instruction output unit 204 (wireless communication unit 110) of the smartphone 100 transmits (outputs) the imaging preparation instruction and the initial transfer conditions to the plurality of imaging devices 10A to 10C through the wireless communication (step S110).

The plurality of imaging devices 10A to 10C that have received (input) the imaging preparation instruction and the initial transfer conditions start of transmission (output) of the live view image to the smartphone 100 through the wireless communication. The image input unit 202 (wireless communication unit 110) of the smartphone 100 receives (input) a plurality of live view images from the plurality of imaging devices 10A to 10C through wireless communication.

The radio wave intensity detection unit 203 of the smartphone 100 detects radio wave intensity between the plurality of the imaging devices 10A to 10C, and the display control unit 244 displays the radio wave intensity between the plurality of imaging devices 10A to 10C in the multi-live view screen (step S112).

The radio intensity comparison unit 233 of the smartphone 100 compares the detected radio wave intensity between the plurality of imaging devices 10A, 10B, and 10C with a threshold value (step S114).

In a case where the radio wave intensity with respect to the at least one of the plurality of imaging devices 10A, 10B, and 10C is smaller than the threshold value (YES in step S114), the execution control unit 250 of the smartphone 100 executes steps S116 to S122.

First, the priority setting unit 234 of the smartphone 100 changes the priority of the live view image according to a change in the radio wave intensity (step S116: an aspect of a priority setting step).

For example, as illustrated in FIG. 4, in a case where the radio wave intensity with respect to the imaging devices 10A and 10B is smaller ("weaker") than the threshold value and the radio wave intensity with respect to the imaging device 10C is equal to or greater ("stronger") than the threshold value, the priority of the live view images LV1 and LV2 respectively corresponding to the imaging devices 10A and 10B are set to "2", and the priority of the live view image LV3 corresponding to the imaging device 10C is set to "1". That is, the initial priorities ("1", "2", and "2") are changed into priorities ("2", "2", and "1") according to the radio wave intensity with respect to the plurality of imaging devices 10A to 10C. In this embodiment, a smaller value indicates a higher priority.

Then, the display aspect setting unit 232 of the smartphone 100 changes a display aspect of a plurality of live view images according to the change in priorities (step S118).

Figure 9:
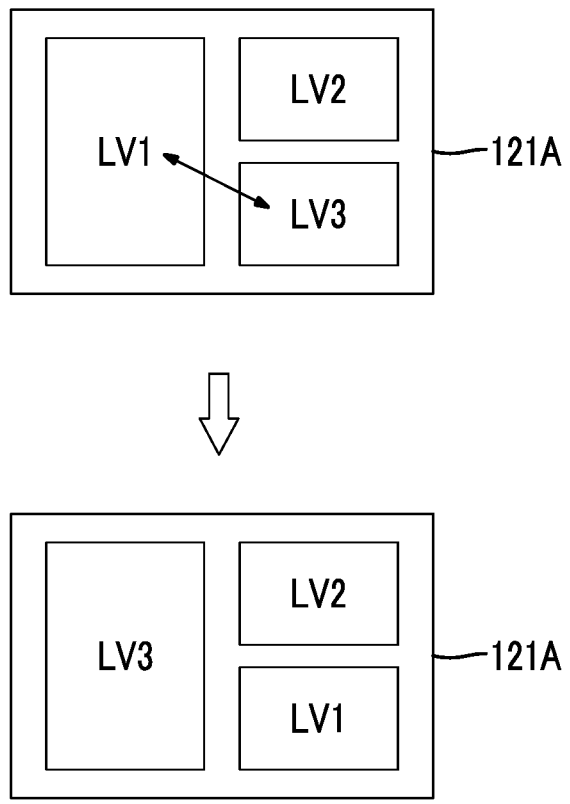
FIG. 9 is a third illustrative diagram that is used for description of a change in a display aspect due to a change in priority according to a change in radio wave intensity

For example, as illustrated in FIG. 9, a layout is changed such that a display size of the live view image LV1 of which the priority is decreased to "2" decreases, and a display size of the live view image LV3 of which the priority is increased to "1" increases. Further, in this example, the layout is changed such that high and low of the priority correspond to left and right of a display position. That is, the live view image LV3 of which the priority is "1" are rearranged to be at the left display position of the live view image display area 121A, and the live view images LV1 and LV2 of which the priority is "2" are rearranged to be at the right display position of the live view image display area 121A.

Then, the transfer condition setting unit 236 of the smartphone 100 changes transfer conditions of a plurality of live view images on the basis of the change in priority (step S120: an aspect of a transfer condition setting step).

For example, as illustrated in FIG. 4, in a case where initial transfer conditions of all of the live view images LV1 to LV3 from the plurality of imaging devices 10A to 10C are the same (for example, a transfer frame rate is 60 fps (frame per second)), the amount of transfer of the live view images LV1 and LV2 of which the priority is "2" is reduced (for example, the transfer frame rate is changed to 20 fps), and the amount of transfer of the live view image LV3 of which the priority is "1" is maintained. Although the case in which only the transfer frame rate is changed has been described by way of example, the transfer image size may be changed together with the transfer frame rate or only the transfer image size may be changed.

FIG. 10 illustrates an example of correspondence relationship information indicating a correspondence relationship between the layout and the priority of the live view image. Such correspondence relationship information has been previously stored in the storage unit 150, and the display aspect setting unit 232 changes the display aspect by referring to the correspondence relationship information stored in the storage unit 150. In FIG. 10, a correspondence relationship for the layouts of the layouts (1) to (6) in FIG. 8 belonging to the pattern 3-D in FIG. 7 is illustrated and a correspondence relationship for the other patterns in FIG. 7 is not illustrated, but a correspondence relationship of the other patterns is also actually included in the corresponding relationship information.

Then, the communication control unit 248 of the smartphone 100 transmits (output) the transfer conditions to the plurality of imaging devices 10A to 10C via the instruction output unit 204 (wireless communication unit 110) through wireless communication (step S122).

The execution control unit 250 of the smartphone 100 determines whether the live view image has been received from at least one of the plurality of imaging devices 10A to 10C (step S124).

The image processing unit 242 of the smartphone 100 trims the received live view image (step S126).

Figure 11:
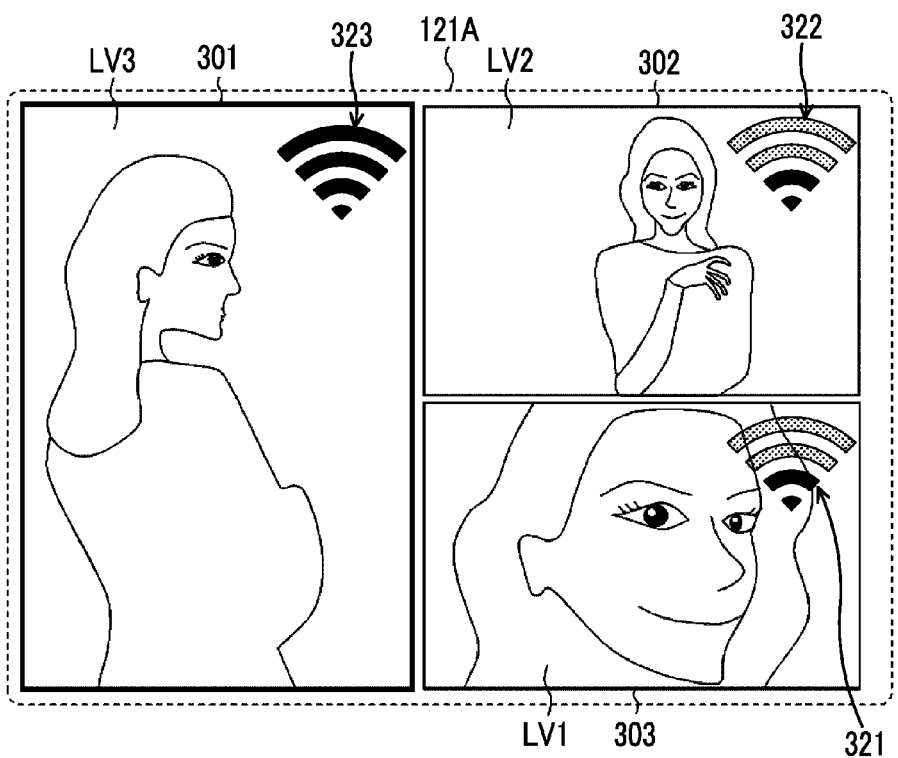
FIG. 11 is an illustrative diagram that is used for description of a radio wave intensity display and a live view image display.

The display control unit 244 of the smartphone 100 displays the live view image LV3 of which the priority is high in the display area 301, and displays the live view images LV1 and LV2 of which the priority is low in the display areas 302 and 303, as illustrated in FIG. 11 (step S128). In FIG. 11, reference numeral 321, reference numeral 322, and reference numeral 323 are icons (radio wave intensity icons) indicating radio wave intensity with respect to the imaging device 10A, the radio wave intensity with respect to the imaging device 10B, and the radio wave intensity with respect to the imaging device 10C, respectively. In this embodiment, the display position is changed according to the priority already displayed in previous step S112 and changed in the present step and the icons are displayed to be superimposed on the live view image.

It is determined whether or not an instruction of imaging that is performed by the plurality of imaging devices 10A to 10C is input to the instruction input unit 212 of the smartphone 100 (step S130). For example, the imaging instruction is determined to have been input in a case where pressing of the release button icon 125 in FIG. 6 is performed in a state in which the live view image is displayed.

In a case where the imaging instruction has been input to the instruction input unit 212 of the smartphone 100 (YES in step S130), the instruction output unit 204 (wireless communication unit 110) of the smartphone 100 transmits (output) the imaging instruction to the plurality of imaging devices 10A to 10C through wireless communication (step S132).

In the plurality of imaging devices 10A to 10C, imaging of a subject is performed. The image input unit 202 (wireless communication unit 110) of the smartphone 100 receives (inputs) a plurality of captured images (still image, moving image, or both) from the plurality of imaging devices 10A to 10C through wireless communication (step S134).

The execution control unit 250 of the smartphone 100 records the plurality of captured images in the storage unit 150 of the smartphone 100, and displays at least one of the plurality of captured images on the display panel 121 of the display and input unit 120 of the smartphone 100 (step S136).

Although the case in which after the live view image is received, the imaging instruction is transmitted to the plurality of imaging devices 10A to 10C, and a plurality of captured images captured by the plurality of imaging devices 10A to 10C according to the imaging instruction are received from the plurality of imaging devices 10A to 10C has been described by way of example in this example, the captured images may be captured automatically in the plurality of imaging devices 10A to 10C.

[Other Examples of Display Aspect Change]

The case where the priority of the live view image is changed and the pattern (shape) of the layout is not changed has been described by way of example with reference to FIG. 9, but the present invention is not limited to such a case. As illustrated in FIG. 12, the pattern of the layout may be changed in a case where there is a change in the priority of the live view image.

FIG. 12 illustrates a case where the display position of the live view image is not changed and only the display size of the live view image is changed in a case where the number of imaging devices is two and the priority of the live view image has been changed.

[Example of Transfer Condition Display]

Figure 13:
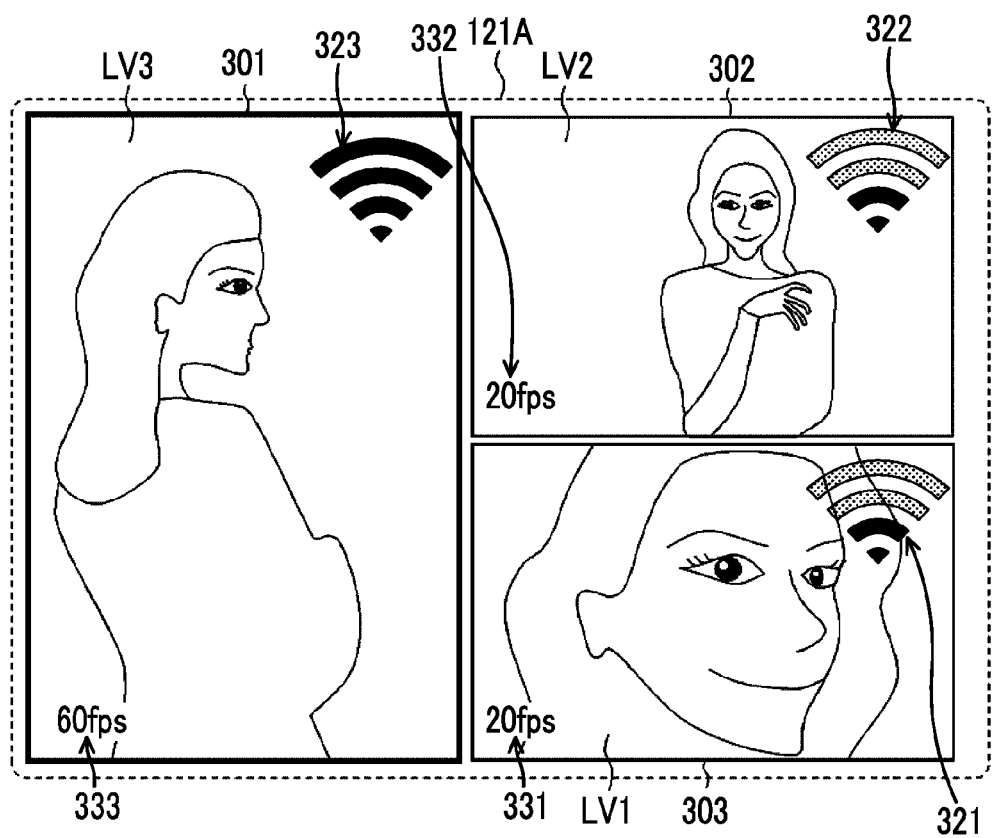
FIG. 13 is an illustrative diagram that is used for description of a display of transfer conditions.

The case where only the radio wave intensity is displayed so that the radio wave intensity is superimposed on the live view image has been described by way of example with reference to FIG. 11, but the present invention is not limited to such a case. As illustrated in FIG. 13, the transfer conditions 331, 332, and 333 of the live view images of the plurality of respective imaging devices 10A, 10B, and 10C may be displayed in the live view image display area 121A by the display control unit 244. FIG. 13 illustrates a case where the frame rate of the transfer is displayed as the transfer condition. The image size of the transfer may be displayed as a transfer condition. In a case where both of the frame rate of the transfer and the image size of the transfer are changed according to the change in priority, it is preferable for both of the frame rate of the transfer and the image size of the transfer to be displayed.

[Variations of System Configuration]

Although the case in which the present invention is applied to the first wireless communication aspect in which the imaging device 10 and the smartphone 100 that is an example of an a live view control unit directly perform the wireless communication as illustrated in FIG. 1 has been described in detail, the present invention may be applied to a second wireless communication aspect illustrated in FIG. 14.

In FIG. 14, imaging devices 10A, 10B, and 10D and a smartphone 100 that is an example of a live view control device indirectly perform wireless communication via an access point AP.

In such a live view system, generally, the smartphone 100 can detect radio wave intensity between the smartphone 100 and the access point AP, and cannot detect radio wave intensity with respect to each of the plurality of imaging devices 10A, 10B, and 10D and the access point AP. Therefore, in a case where communication is performed via the access point AP, the radio wave intensity detection unit 203 of the present invention monitors an actual transfer situation of the live view image to estimate the radio wave intensity with respect to each of the plurality of the imaging devices 10A, 10B, and 10D, or acquires radio wave intensity with respect to each of the plurality of imaging devices 10A, 10B, and 10D and the access point AP from the access point AP. It is conceivable that the estimation of the radio wave intensity is performed using, for example, the number of retransmissions of each frame, an actual frame rate, and the like.

In the case of FIG. 14, the imaging devices 10A and 10B and the imaging device 10D are different in a model. The imaging device 10D is a pan and tilt camera in which an imaging unit including an imaging lens and an imaging element is rotatable in a pan direction and a tilt direction. The present invention is applicable to a case where the model is different between the imaging devices.

Further, the present invention is not particularly limited to the examples described in this specification and the accompanying drawings, and may be implemented in aspects different from the examples described in this specification and the accompanying drawings without departing from the gist of the present invention.

EXPLANATION OF REFERENCES 10 (10A, 10B, 10C, 10D): imaging device
100: smartphone (live view control device)
101: main control unit
110: wireless communication unit
120: display and input unit
121: display panel
122: operation panel
202: image input unit
203: radio wave intensity detection unit
204: instruction output unit
212: instruction input unit
232: display aspect setting unit
233: radio wave intensity comparison unit
234: priority setting unit
236: transfer condition setting unit
242: image processing unit
244: display control unit
248: communication control unit
250: execution control unit

What is claimed is:
1. An imaging control device, comprising:
a wireless communication unit that receives a plurality of live view images from a plurality of imaging devices through wireless communication;
a display control unit that displays each of the plurality of live view images received from the plurality of imaging devices in each of a plurality of areas of a display screen capable of displaying an image;

a radio wave intensity detection unit that detects radio wave intensity with respect to each of the plurality of imaging devices;

a priority setting unit that sets a priority of the plurality of live view images on the basis of the radio wave intensity detected by the radio wave intensity detection unit;

a transfer condition setting unit that sets transfer conditions including at least one of a frame rate of transfer and an image size of the transfer of each of the plurality of live view images on the basis of the priorities of the plurality of live view images; and a communication control unit that transmits the transfer conditions set by the transfer condition setting unit to the plurality of imaging devices via the wireless communication unit.

2. The imaging control device according to claim 1, further comprising:

a radio wave intensity comparison unit that compares radio wave intensity with respect to each of the plurality of imaging devices with a threshold value, wherein the priority setting unit sets a lower priority in a case where the radio wave intensity is smaller than the threshold value than in a case where the radio wave intensity is equal to or greater than the threshold value, and the transfer condition setting unit decreases at least one of a frame rate of the transfer and an image size of the transfer when the priority is lower.

3. The imaging control device according to claim 1, further comprising:

a display aspect setting unit that changes an aspect of a display of the live view image according to the priority.

4. The imaging control device according to claim 3, wherein the display aspect setting unit sets, among the live view images, at least one of a display size and a display position of the live view image according to the priority.

5. The imaging control device according to claim 1, wherein the display control unit displays the detected wave intensity on the display screen.

6. The imaging control device according to claim 1, wherein the display control unit displays the at least one of the frame rate of transfer and the image size of transfer of each of the plurality of live view images on the display screen.

7. The imaging control device according to claim 1, wherein the communication control unit transmits an imaging instruction to the plurality of imaging devices via the wireless communication unit after the live view image is received, and receives a plurality of images captured by the plurality of imaging devices according to the imaging instruction from the plurality of imaging devices via the wireless communication unit.

8. The imaging control device according to claim 1, wherein the communication control unit receives the images captured automatically in the plurality of imaging devices from the plurality of imaging devices.

9. An imaging system comprising:
imaging devices; and
the imaging control device according to claim 1.

10. An imaging control method, comprising:

a step of receiving a plurality of live view images from a plurality of imaging devices through wireless communication;

a step of displaying each of the plurality of live view images received from the plurality of imaging devices in each of a plurality of areas of a display screen capable of displaying an image;

a step of detecting radio wave intensity with respect to each of the plurality of imaging devices;

a priority setting step of setting a priority of the plurality of live view images on the basis of the detected radio wave intensity;

a transfer condition setting step of setting transfer conditions including at least one of a frame rate of transfer and an image size of the transfer of each of the plurality of live view images on the basis of the priorities of the plurality of live view images; and a step of transmitting the set transfer conditions to the plurality of imaging devices through wireless communication.

11. The imaging control method according to claim 10, further comprising:

a step of comparing radio wave intensity with respect to each of the plurality of imaging devices with a threshold value, wherein a lower priority is set in a case where the radio wave intensity is smaller than the threshold value than in a case where the radio wave intensity is equal to or greater than the threshold value, and at least one of a frame rate of the transfer and an image size of the transfer is decreased when the priority is lower.

12. The imaging control method according to claim 10, further comprising:

changing an aspect of a display of the live view image according to the priority.

13. The imaging control device according to claim 10, further comprising:

setting, among the live view images, at least one of a display size and a display position of the live view image according to the priority.

14. A computer-readable non-transitory recording medium having a program that causes a computer to execute steps of:

receiving a plurality of live view images from a plurality of imaging devices through wireless communication;

displaying each of the plurality of live view images received from the plurality of imaging devices in each of a plurality of areas of a display screen capable of displaying an image;

detecting radio wave intensity with respect to each of the plurality of imaging devices;

setting a priority of the plurality of live view images on the basis of the detected radio wave intensity;

setting transfer conditions including at least one of a frame rate of transfer and an image size of the transfer of each of the plurality of live view images on the basis of the priorities of the plurality of live view images; and transmitting the set transfer conditions to the plurality of imaging devices through wireless communication.

* * * * *